Figure 1:
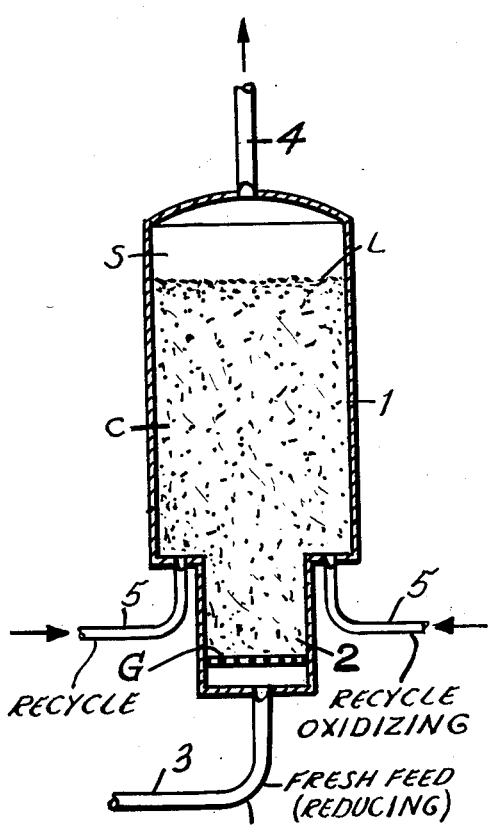
Figure 2:
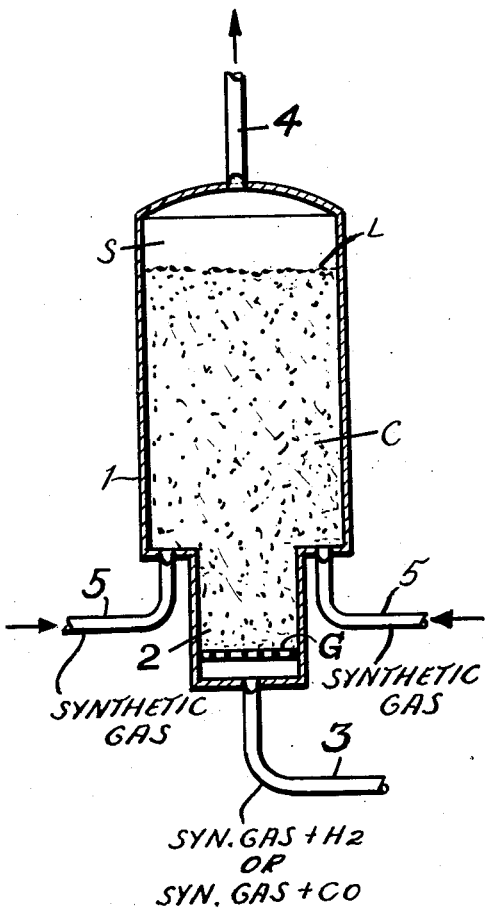

Oct. 14, 1952 — R. W. KREBS — 2,614,114
HYDROCARBON SYNTHESIS
Filed June 26, 1948

Robert W. Krebs Inventor
By J. Cashman Attorney

Patented Oct. 14, 1952

2,614,114

UNITED STATES PATENT OFFICE 2,614,114

HYDROCARBON SYNTHESIS

Robert W. Krebs, Baton Rouge, La., assignor to Standard Oil Development Company, a corporation of Delaware Application June 26, 1948, Serial No. 35,359

3 Claims. (Cl. 260—449.6)

The present invention relates to improvements in the method of synthesizing hydrocarbons and oxygenated hydrocarbons by reducing the oxides of carbon with hydrogen in the presence of a powered iron catalyst maintained in a reaction zone in the form of a dense, turbulent, fluidized catalyst in gasiform material. More particularly, the present invention relates to maintaining a portion of the fluidized catalyst in the reaction zone in a reducing atmosphere with respect to iron and it has been discovered that by so operating improved results have been obtained, in that the catalyst is maintained at a higher activity level.

In order to maintain the powered iron catalyst at the maximum activity in a hydrocarbon synthesis process, it is necessary that the catalyst be maintained in a reduced state. Certain feed gases or a fresh feed-recycle gas mixture containing, of course, hydrogen and carbon monoxide, usually contain sufficient carbon dioxide to be oxidizing in nature so that the iron catalyst rapidly oxidizes and in this state is less active. When other feed gases which are rich in hydrogen and carbon monoxide are employed, however, the catalyst is maintained in a reduced condition despite the fact that after appreciable synthesis has taken place, the environment in the reaction zone is oxidizing in nature due to the presence of water vapor and carbon dioxide which are products of the reaction.

According to the present invention the gases maintained in the inlet region of the reaction zone are always reducing in nature so that the catalyst, being well mixed (as it is in a well fluidized bed), will frequently pass through a reducing zone. This is effected by separately introducing a portion of the fresh feed gas and the more oxidizing recycle gas (containing $CO_2$, normally) or by enriching a separate portion of synthesis gas with added hydrogen and separately introducing this mixture into the reaction zone.

The main object of the present invention, therefore, is to maintain the iron catalyst in a hydrocarbon synthesis process performed in the presence of fluidized mass of said catalyst in a reduced state throughout the reaction and, therefore, in the state of maximum activity.

Another object of the invention is to so manipulate the hydrocarbon synthesis process carried out in the presence of a fluidized bed of powdered iron catalyst, so that the catalyst within the reaction zone is at least periodically subjected to the influence of a reducing atmosphere in spite of the fact that some of the products of reaction, such as water vapor and carbon dioxide, tend to form within the reaction zone an atmosphere oxidative to the iron, tending, therefore, to convert at least a portion of the iron to the oxide, resulting in a serious impairment of catalyst activity.

Other and further objects will appear from the following disclosure considered in connection with the accompanying drawing and the claims.

In the accompanying drawing are shown, diagrammatically in Figures I and II, reactors containing a fluidized bed of catalyst and the form that the reactor should preferably take and the manner in which the gasiform material should be fed to the reactors have been indicated.

Similar reference characters apply to similar parts throughout the views.

Referring to Figures I and II, I represents a reactor which is in the form of a cylinder having a bottom portion 2 of substantially less diameter than the main portion 1. The reactors are provided with screens or grids G. In the case of the design shown in Figure I, fresh feed, that is to say, a feed gas containing carbon monoxide and hydrogen enters the system through line 3 and is discharged in the lower portion 2 of the reactor where it passes upwardly through the screen or grid G into the body of catalyst C, which catalyst is in the form of a dense, turbulent, fluidized bed extending from G to an upper dense phase level L. As is known, the catalyst may be maintained in the form of a fluidized bed by controlling the superficial velocity of the gases passing upwardly through the reactor, responsive to the particle size and distribution of the said catalyst. In other words, where the catalyst has a particle size of from 0 to 200 microns, 50 to 70% thereof having a particle size of from 20–80 microns, the bed of catalyst can be maintained in the aforesaid fluidized condition by maintaining the superficial velocity of the gas within the range of from ½ to 1½ ft. per second. By superficial velocity it is meant that velocity which would be attained with an empty catalyst reactor. Depending on the mass or actual amount of catalyst present in the reactor, the dense, turbulent suspension will have an upper level L and above L to the top of the reactor there will be a dilute suspension of catalyst in gasiform material. This space has been designated as S. This space S serves as a disengaging space wherein catalyst carried thereto is permitted to separate from the gasiform material and gravitate toward the upper dense phase level L. It is usually advisable to dispose one or more solids-gas separating devices, such as centrifugal separators (not shown), in the upper portion of the space S for the purpose of separating substantially the last traces of catalyst from the gasiform product about to issue from the said reactor.

The gasiform product is withdrawn from the reactor 1 through line 4 and processed according to known means to recover the gasoline, gas oil and various oxygenated compounds, etc. The showing of these means has not been included in the drawing nor has it been described in words in the specification for those familiar with this art are aware of conventional methods of purifying and recovering desired products.

In respect to conditions, temperatures of from 600°–750° F., total pressures of from 250–800 p. s. i. g. are maintained in the reaction zone and the hydrogen to carbon monoxide molar ratios in the fresh feed of from 1 to 2½ give good results from the standpoint of conversion of the reactants and selectivity to desired products, providing always, of course, that the catalyst is maintained in good state of activity. It should be stated that the iron catalyst is usually associated with a minor amount of a promoting agent such as, for example, potassium carbonate or some other alkali metal compound.

However as previously indicated, as time goes on it has been noted that in spite of favorable conditions, as set forth above, the reaction at the start proceeds smoothly, but nevertheless there comes a time when the catalyst loses activity and this is ascribed to the fact that the catalyst becomes oxidized. Means have been discovered, as indicated, for obviating this unfavorable condition as follows:

Referring in particular to Figure I, it will be noted that the fresh feed, which is composed largely of carbon monoxide and hydrogen, is discharged into the lower portion 2 of the reactor. Since this gas contains highly reducing agents, hydrogen and carbon monoxide, the catalyst in the portion 2 of the reactor will be subjected to the influence of these reducing gases and, as it is in an oxidized state, it will be reduced, or de-oxidized at least in part. That is to say, the amount of oxygen combined with the iron will be reduced below an amount interfering with the activity of the catalyst.

It will be further noted that the recycle material, that is to say, the gasiform material returned from the product recovery system and which not only contains unconverted hydrogen and carbon monoxide, but also contains carbon dioxide and water vapor, is introduced into the reactor at lower portions of the upper expanded part 1 of the reactor. The gas entering at 5, since it contains carbon dioxide and water vapor, is oxidative with respect to the catalyst and, therefore, tends to convert the iron at least in part to one of its oxides.

Because of that characteristic of the fluidized bed of catalyst which is conducive of good mixing of all portions of the fluidized bed, a catalyst which has become oxidized in the upper expanded portion 1 of the reactor eventually descends into the portion 2 of the reactor where it is exposed to a highly reducing atmosphere and, therefore, reduced at least in part.

A recycle ratio of 0.5 to 3 volumes of recycled gas per volume of fresh feed is preferred. The range of recycle ratios from 0.5 to 3.0 will be those ordinarily used in recycle operation. The specific ratio used is, of course, dictated by several factors, among which are the gas velocities required for good fluidization and heat transfer in the reactor, the feed composition desired for maintaining good selectivity and the activity of the catalyst itself. At present the optimum recycle ratios are in the region of 1 to 2.

In Figure II the reactor is operated under so-called "once through" principle, i. e. no recycle. In this once-through type of operation, since the water and perhaps carbon dioxide are present in the reactor where they are being continuously formed along with the hydrocarbons and oxygenated hydrocarbons, there will, therefore, tend to be created an atmosphere in the reaction zone which is conducive to oxidation of the iron catalyst. In that situation, nevertheless, the fresh synthesis gas at the bottom portion 2 of the reactor through line 3 has admixed therewith additional hydrogen, thus creating in the portion 2 of the reactor a highly reducing atmosphere. Suppose, for example, that the normal feed to reactor 1 contains 1.8 mols of hydrogen per mol of carbon monoxide, the rate of reaction forming, among other products, water and carbon dioxide might be sufficient that in order to create the reducing atmosphere in portion 2 of the reactor, this synthesis gas would have added thereto, say, 1 to 2 mols of additional hydrogen per mol of hydrogen in the synthesis gas.

The main portion of the synthesis gas in this modification enters the reaction through line 5. This latter gas containing hydrogen and carbon monoxide in the proportions best suitable have obtained maximum conversion and selectivity.

As in the case of Figure I, catalyst in the upper portion 1 of the reactor tends to descend into portion 2 and in the latter environment any oxidized catalyst tends to be reduced.

Thus, there have been shown and described means for maintaining an iron catalyst in reduced condition during an extended time of use in the hydrocarbon synthesis process. The means by which this result was accomplished may be carried out within the same generally confined space and does not, therefore, require the use of more than one vessel.

While the dimensional ratio of the diameters and depths of reducing zone 1 and the main reactor 2 will vary with changing conditions, a guide may be given as to preferred ratios.

Recent studies have indicated that some catalysts are much more susceptible to oxidation in the reactor than others. For example, ordinary ammonia synthesis catalyst (fused magnetite) oxidizes easily, whereas red iron oxide sintered in hydrogen at about 1500° F. is very resistant to oxidation. The ratio of the reducing zone to the oxidizing zone may therefore vary. In order to achieve good selectivity, however, the reducing zone (as measured by the volume of catalyst therein) in which gas composition is not favorable for good selectivity (because the hydrogen to carbon monoxide ratio is high) should not be over one-fifth of the total catalyst volume and a ratio around 0.1 is preferred. In other words, the reducing zone should preferably contain about one-tenth the volume of catalyst contained in the reaction zone. A 0.1 volume ratio could be achieved, for instance, by a reducing zone of one-half the larger diameter and 0.4 the height of the larger section (counting only that portion of the larger section filled with catalyst). In order to prevent undue gas mixing from the large zone down to the small zone, it is desirable that the diameter of the latter be smaller than half of the former and the height of the smaller zone be greater than 0.4 of the larger. The practical range of diameter ratios is between one-fifth and one-half.

Hereinbefore means have been described for achieving the ends of this invention. The main purpose is, of course, to maintain the catalyst in a state of oxidation such that at reaction conditions of temperature, pressure, contact time, hydrogen to carbon monoxide ratio in the fresh feed, the conversion level shall be high (say 98% based on the CO fed) and the selectivity shall also be maintained at a high level (say 185 or more cubic centimeters of $C_4+$ hydrocarbons per standard cubic meter of $CO+H_2$ converted).

When completely reduced iron or iron of low oxygen content is charged to the reactor, after say, a day's continuous operation, the iron will contain 20–22 weight per cent combined oxygen in the normal operation. By the present improvements this may be reduced to below 20 per cent—say from 10–15 per cent. Under these conditions of a relatively low state of oxidation, the catalyst will be maintained in a high state of activity during an increased life period.

Numerous modifications of the present invention will be apparent to those who are familiar with this art without departing from the spirit thereof.

What is claimed is:

1. In a hydrocarbon synthesis process in which a fluidized bed of powdered iron catalyst in a synthesis reaction zone is contacted with feed gas containing CO and $H_2$ under synthesis conditions of temperature, pressure, and contact time, and wherein said catalyst tends to become at least partially oxidized, the improvement resulting in maintaining the catalyst in an active state which comprises establishing an upper portion of said zone of greater cross-section than a lower portion of said zone in the same confined space, said upper portion confining a greater fraction of said bed than said lower portion, said upper and said lower portion of said zone being in open communication and forming a single unitary uninterrupted zone, said lower portion being further characterized in that it has a diameter less than one-half of said upper portion and has a height greater than four-tenths that of said upper portion, contacting said bed in said upper portion with a gasiform material comprising hydrogen and oxides of carbon in proportions to give maximum conversion of total gas feed to valuable hydrocarbons, and whereby said catalyst becomes at least partially oxidized, and contacting said bed in said lower portion with a gas consisting predominantly of $H_2$ and CO whereby said oxidized catalyst is reduced to the extent that its oxygen content is below about 20%.

2. The process of claim 1 wherein said process is a once-through operation and wherein synthesis gas containing $H_2$ and CO in the ratio of from 1 to 2 mols $H_2$ per mol CO is passed into said upper portion, and wherein synthesis gas containing a large excess of one of the reactants is passed into said lower portion.

3. In a hydrocarbon synthesis process in which a fluidized bed of powdered promoted iron catalyst in a synthesis reaction zone is contacted with feed gas containing carbon monoxide and hydrogen under synthesis conditions of temperature, pressure and contact time and wherein said catalyst tends to become at least partially oxidized, the improvement resulting in maintaining the catalyst in an active state which comprises establishing an upper expanded portion of said zone of greater cross section than a lower portion of said zone in the same general confined space, said upper and said lower portion of said zone being in open communication and forming a single unitary uninterrupted zone, said lower portion being further characterized in that it has a diameter less than one-half of said upper portion and has a height greater than four-tenths that of said upper portion, said upper portion confining a greater fraction of said bed than said lower portion, contacting said bed in said lower portion with fresh feed gas consisting essentially of $H_2$ and CO present in molecular proportions of from about 1 to 2 mols hydrogen per mol of CO, contacting said bed in said upper expanded portion with a gasiform mixture comprising hydrogen, carbon monoxide and carbon dioxide in proportions to give maximum conversion of total gas feed to valuable hydrocarbons and whereby said catalyst becomes at least partially oxidized, withdrawing from said upper portion of said reaction zone, reaction products and unreacted gases, recycling to a lower portion of said upper expanded section recycle gas comprising CO, $CO_2$ and $H_2$ and maintaining an oxygen content of said catalyst within said total reaction zone below about 20%.

ROBERT W. KREBS.

REFERENCES CITED

The following references are of record in the file of this patent:

UNITED STATES PATENTS

| Number | Name | Date |
| --- | --- | --- |
| 2,251,554 | Sabel | Aug. 5, 1941 |
| 2,414,276 | Sensel | Jan. 14, 1947 |
| 2,414,883 | Martin | Jan. 28, 1947 |
| 2,447,505 | Johnson | Aug. 24, 1948 |
| 2,463,912 | Scharmann | Mar. 8, 1949 |